(12) United States Patent
Chang et al.

(10) Patent No.: US 7,486,594 B2
(45) Date of Patent: Feb. 3, 2009

(54) ADJUSTABLE OPTICAL PICKUP ACTUATOR

(75) Inventors: Tsung-Kai Chang, Hsinchu Hsien (TW); Chien-Kuo Chen, Keelung (TW); Pao-Heng Shen, Hsinchu Hsien (TW)

(73) Assignee: TopRay Technologies Inc., Hsinchu (TW)

( * ) Notice: Subject to any disclaimer, the term of this patent is extended or adjusted under 35 U.S.C. 154(b) by 614 days.

(21) Appl. No.: 11/338,182

(22) Filed: Jan. 23, 2006

(65) Prior Publication Data
US 2007/0171774 A1 Jul. 26, 2007

(51) Int. Cl.
*G11B 7/00* (2006.01)
(52) U.S. Cl. .................................. 369/44.14
(58) Field of Classification Search ............. 369/44.12, 369/44.14, 44.15, 44.32, 53.19
See application file for complete search history.

(56) References Cited
U.S. PATENT DOCUMENTS
5,627,687 A    5/1997  Fujisawa ................. 359/823
5,986,983 A *  11/1999 Simpson et al. ......... 369/44.14

FOREIGN PATENT DOCUMENTS
TW          M253044        12/2004

\* cited by examiner

*Primary Examiner*—Nabil Z Hindi

(57) ABSTRACT

An adjustable optical actuator with tilting function is provided, including two focusing coils, a tilting coil, and two tracking coils. A lens holder is hanged on a yoke base. The focusing coils are placed on the two sides of the lens holder, and the current in the focusing coils is perpendicular to the optical axis of the lens. The tilting coil is placed on the lens holder, and the current in the tilting coil is perpendicular to the optical axis of the lens. The tracking coils are placed on the lens holder, and the current in the tracking coils is parallel to the optical axis of the lens. Four magnets are placed on the yoke base so that the four magnets are placed at the four corners of the lens holder to generate a closed magnetic-flux. The lens holder, focusing coils, tilting coil, and tracking coils are within the scope of the magnetic-flux generated by the four magnets so that the actuator has the functions of focusing, tracking and tilting for adjustment.

4 Claims, 5 Drawing Sheets

ADJUSTABLE OPTICAL PICKUP ACTUATOR

FIELD OF THE INVENTION

The present invention generally relates to a CD-ROM player, and more specifically to a structure of an adjustable optical actuator of a CD-ROM player.

BACKGROUND OF THE INVENTION

The recording devices using optical recording media, such as CD-ROM or MO are an important part for data recording. All these optical devices have an optical pickup for sending light beams to the optical recording media and receiving reflected light beams from the optical recording media. The optical pickup includes a light source, such as semiconductor laser, for emitting light beam, and a lens for focusing light beam to the optical recording media. Furthermore, the optical pickup requires an actuator for driving the lens to rectify the deviation of the focus and the lens tracking so that the light beam can be precisely focused and the recording tracks can be correctly tracked.

The majority of the actuators employ the electromagnetic method to drive the objective lens for focus and tracking deviation rectification. Therefore, a focusing coil and a tracking coil are included in the pickup devices. The focusing coil is orthogonal to the optical axis of the objective lens so that the objective lens can move up and down along the focusing direction. The tracking coil is parallel to the optical axis of the objective lens so that the lens can move along the tracking direction for rectification.

As the access speed of the optical recording media increases, the demands on the response speed and sensitivity of the electromagnetic actuator for optical pickup also increases. Taiwan Patent No. M253,044 and U.S. Pat. No. 5,627,687 both disclosed a structure of an electromagnetic actuator. However, both patents only provided focusing and tracking deviation rectification, while the tilting angle control function is not provided.

SUMMARY OF THE INVENTION

The present invention has been made to overcome the above-mentioned drawback of conventional optical pick actuator. The primary object of the present invention is to provide an electromagnetic actuator for objective lens including the functions of focusing, tracking and tilt angle adjustment so that the control to the optical pickup is more precise and data access to the optical recording media is more efficient.

To achieve the above object, the present invention includes two focusing coils, a tilt coil, and two tracking coils. A lens holder is hanged on a yoke base. The focusing coils are placed on the two sides of the lens holder, and the current in the focusing coils is perpendicular to the optical axis of the objective lens. The tilt coil is placed on the lens holder, and the current in the tilt coil is perpendicular to the optical axis of the objective lens. The tracking coils are placed on the lens holder, and the current in the tracking coils is parallel to the optical axis of the objective lens. Four magnets are placed on the yoke base so that the four magnets are placed at the four corners of the lens carrier to generate a closed magnetic-flux. The lens holder, focusing coils, tilt coil, and tracking coils are within the scope of the magnetic-flux generated by the four magnets so that the actuator has the functions of focusing, tracking and tilting for adjustment.

The present invention includes four L-prominence yoke holding magnet.

The present invention further includes a cover above the yoke protrudes of the yoke base. The cover covers the magnets and the coils to improve the stability of the magnetic-flux.

Compared with the conventional electromagnetic actuator, the present invention provides the tilt function in addition to focusing and tracking functions. The present invention can therefore provide more flexibility and precision in controlling the pickup device.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
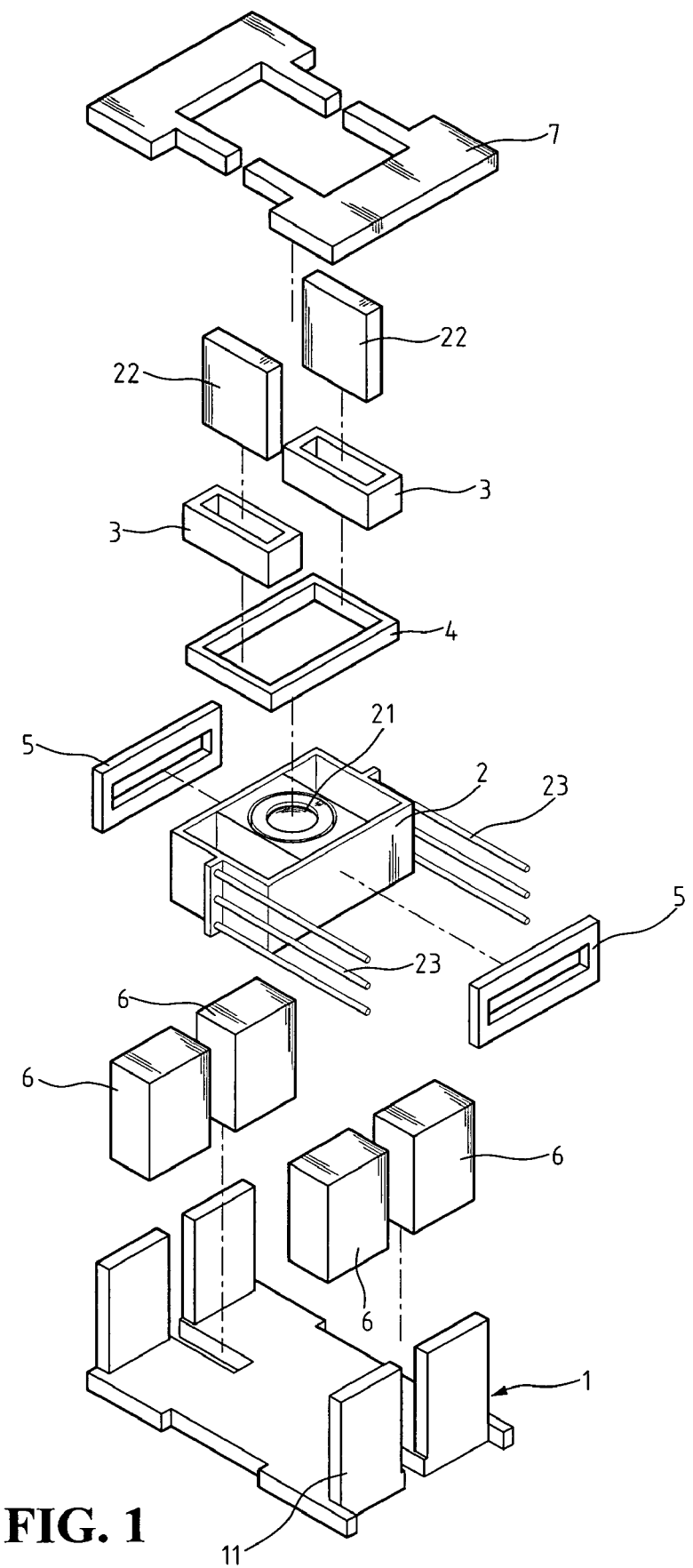
FIG. 1 shows a schematic three-dimensional view of the actuator according to the invention.
Figure 2:
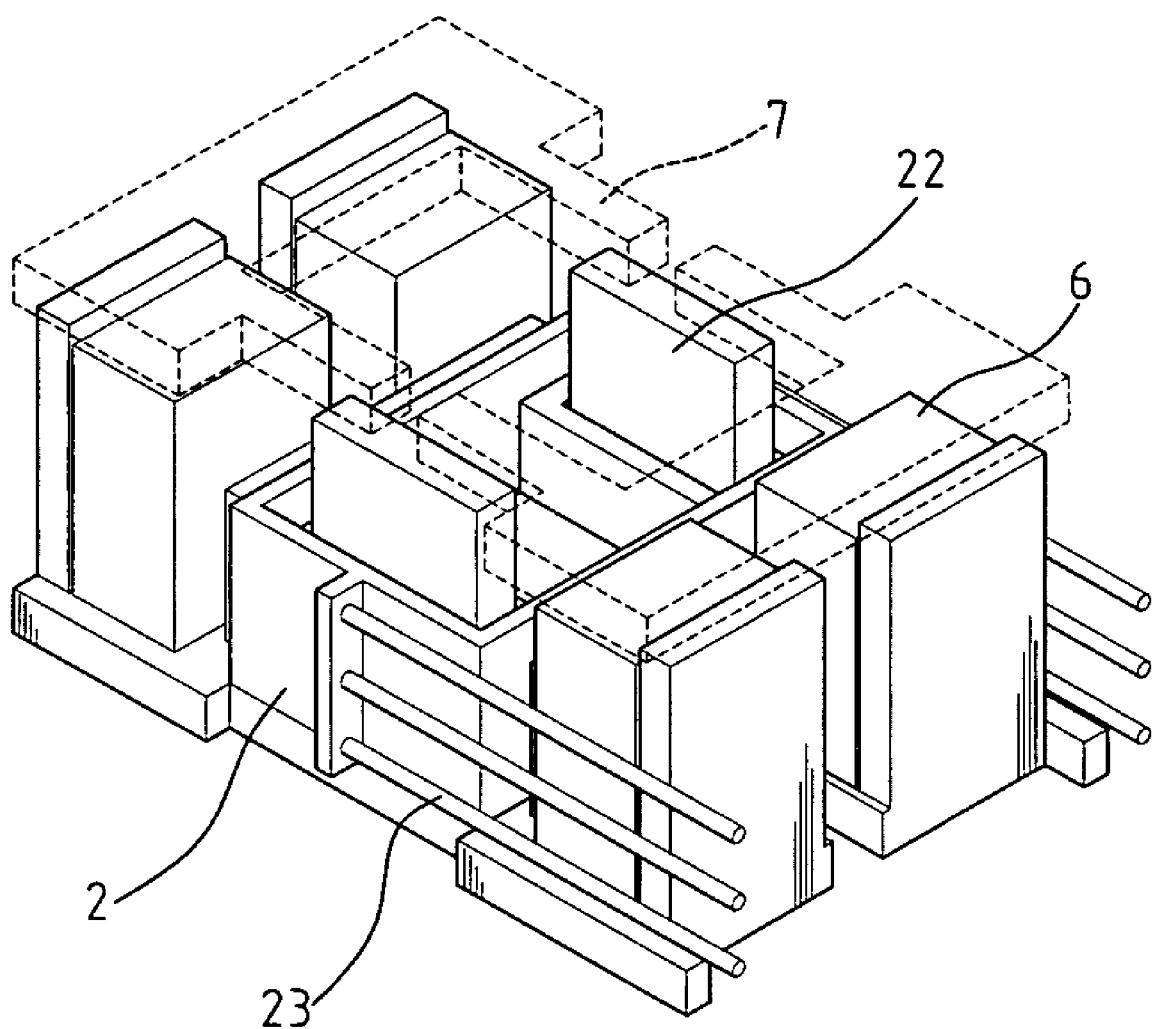
FIG. 2 shows an exploded view of the actuator shown in FIG. 1.
Figure 3:
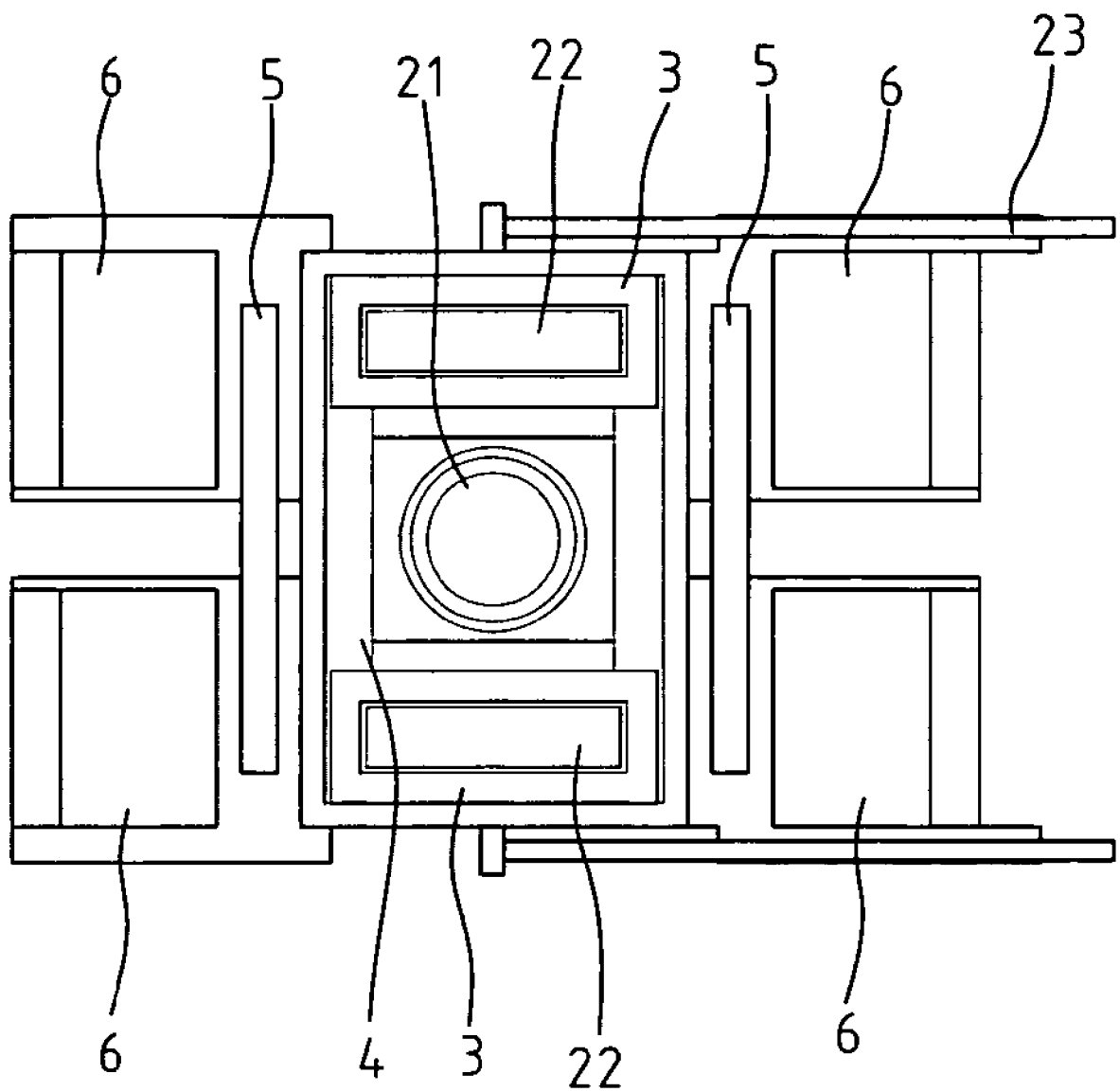
FIG. 3 shows a top view of the actuator of the present invention.
Figure 4:
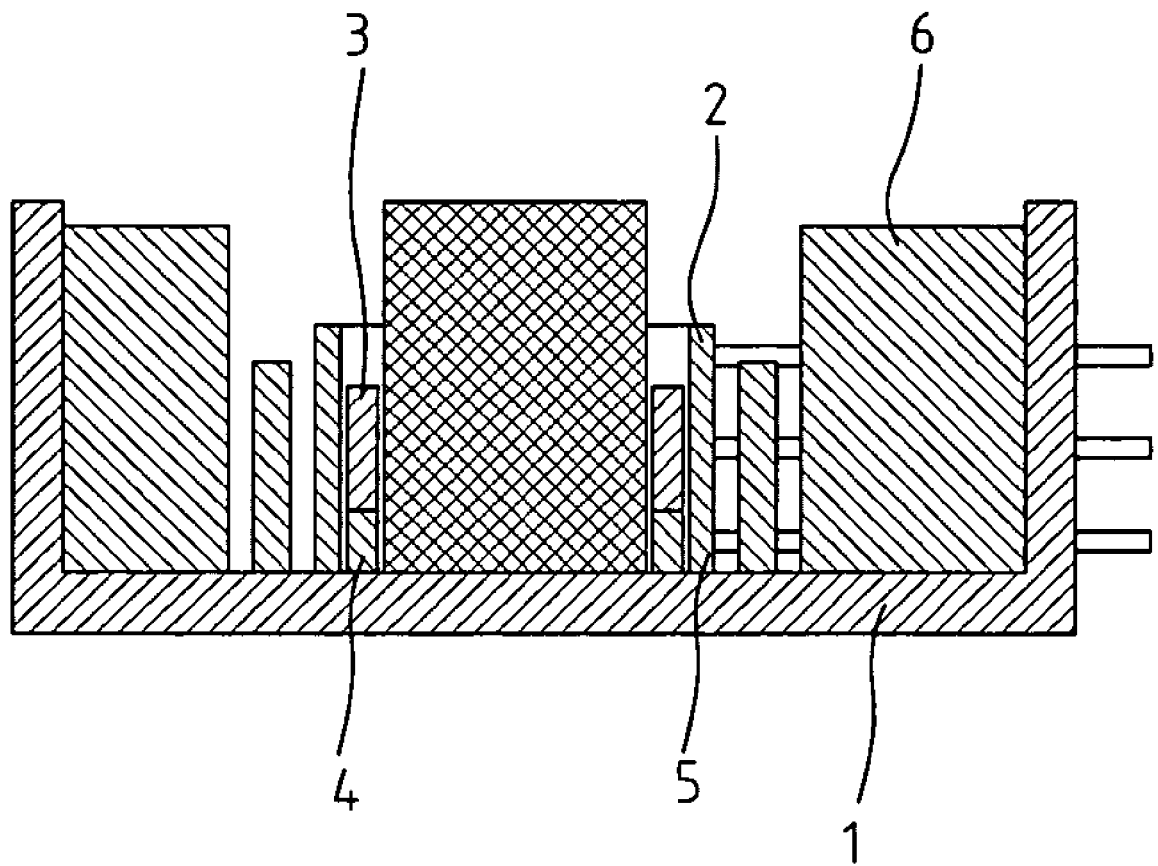
FIG. 4 shows a front cross-sectional view of the actuator of the present invention.

Refer to FIGS. 1-4. An actuator of the present invention includes a yoke base 1, a lens holder 2, two focusing coils 3, two tracking coils 5, a tilting coil 4, and four magnets 6. Yoke base 1 is for carrying the above elements, and the four corners of yoke base 1 include four yoke protrudes 11 extending upwards.

Lens holder 2 is a carrier with a lens 21. The two sides of lens holder 2 is attached to spring wires 23. Lens holder 2 is hanged on yoke base 1 by spring wires 23.

Two focusing coils 3 are placed on yoke protrude bumps 22 on the two opposite sides of lens holder 2. Focusing coils are perpendicular to the optical axis of lens 21 for controlling the movement of lens 21 along the focusing direction.

Tilting coil 4 is on lens holder 2 and is placed on the above yoke protrude bumps 22. The current in tilting coil 4 is perpendicular to the optical axis of lens 21 and parallel to the current in focusing coils 3. Therefore, a single coil will be sufficient to generate an opposite force in the magnetic-flux to controlling the tilting angle of lens 21.

Two tracking coils 5 are placed on the opposite sides of lens holder 2. Two tracking coils 5 are parallel to the optical axis of lens 21 for controlling the movement of lens 21 along the tracking direction.

Four magnets 6 are placed at the four corners of yoke base 1 and each magnet 6 is leaning against each yoke protrude 11. Four magnets 6 generate a closed magnetic-flux.

Lens holder 2, focusing coils 3, tilting coil 4, and tracking coils 5 are within the scope of the magnetic-flux generated by magnets 6.

To stabilize the magnetic-flux and prevent the interference of magnetic lines, the present invention can further include a lid 7 between lens holder 2 and magnets 6.

For the two focusing coils 3 to generate a larger force, the present invention using the stuffing method to engage focusing coils 3 to lens holder 2 so that focusing coils 3 are closer to the surface of the magnets. The magnetic-flux on the effective coil force surface is stronger than the conventional actuator for increase the force of the focusing coil.

Figure 5:
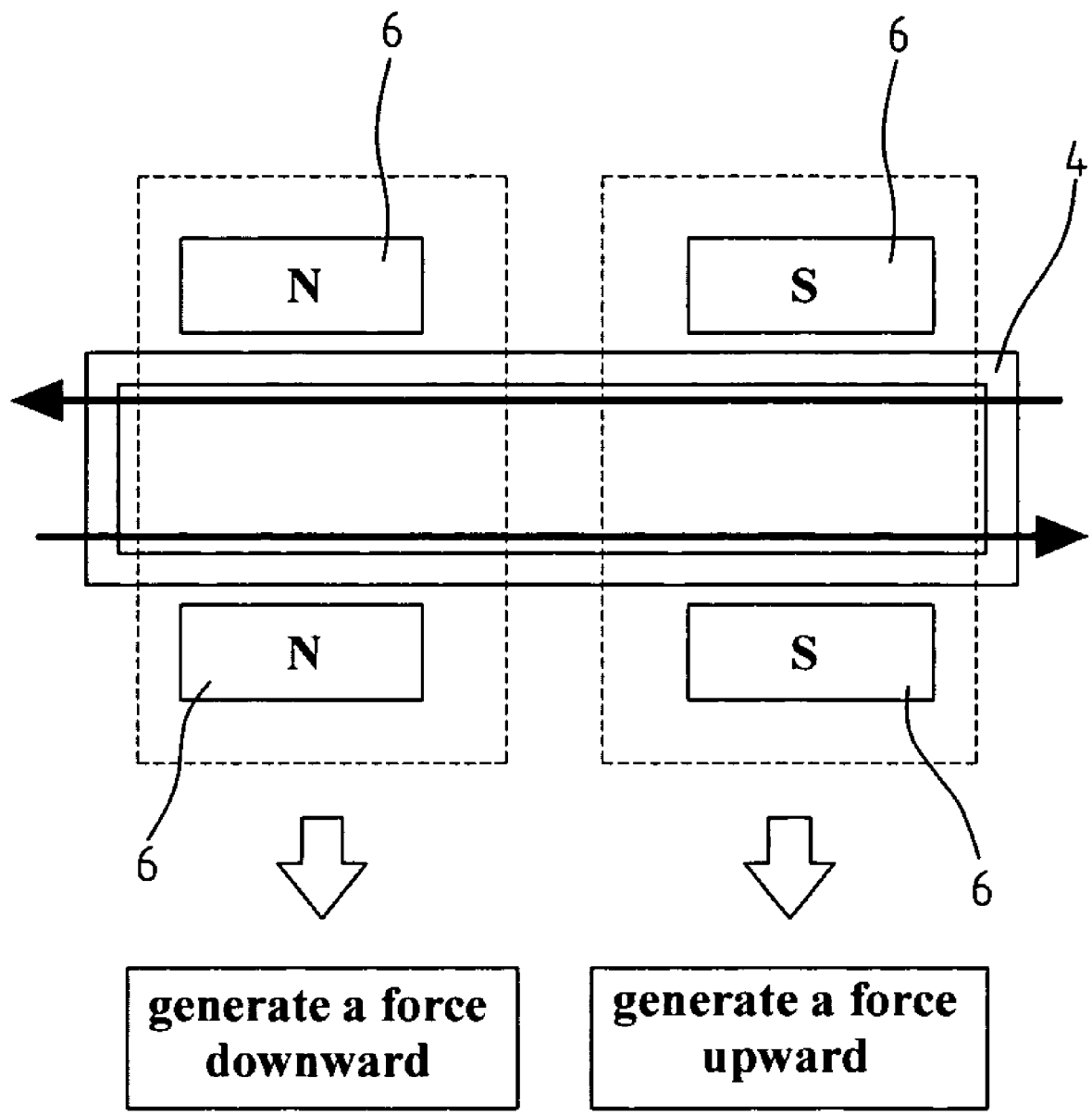
FIG. 5 shows a schematic view of the tilting function of the actuator of the present invention.

Another feature of the present invention is shown in FIG. 5. By the Ampere's law, when a current flows through a coil in a magnetic-flux, the interaction between the magnetic-flux and the current will generate a force. The strength of the force is proportional to the strength of the magnetic-flux and the current, and the direction of the force is determined by the directions of the magnetic-flux and the current. Therefore, the force can be controlled by adjusting the current the magnetic-flux so that the actuator can tilt. The present invention uses four magnets 6 and a tilting coil 4 to tilt the actuator, and uses two pairs of magnets to generate magnetic-flux direction so that the conductive line passing the magnetic-flux make experiences the opposite forces and tilts.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An adjustable optical pickup actuator with tilting, comprising:

a yoke base;

a magnetic-flux, further comprising a lens, said lens holder being located within the scope of said base, said magnetic-flux being suspended on two side with spring wires hanging on said yoke base;

two focusing coils, located on two opposite sides of said lens holder, current in said focusing coils being perpendicular to the optical axis of said lens;

a tilting coil, located on said magnetic-flux, current in said tilting coil being perpendicular to the optical axis of said lens, and being parallel to said current in said focusing coils;

two tracking coils, located on two opposite sides of said magnetic-flux, current in said tracking coils being parallel to the optical axis of said lens; and four magnets, located at four corners of said yoke base for generating a closed magnetic-flux, said magnetic-flux, said focusing coils, said tilting coil and said tracking coils being located within the scope of said magnetic-flux.

2. The optical pickup actuator as claimed in claim 1, wherein said tilting coil is located on said magnetic-flux, and is placed to surround two yoke protrude bumps of said magnetic-flux, the current in said tilting coil is perpendicular to the optical axis of said lens, and is parallel to said current in said focusing coils.

3. The optical pickup actuator as claimed in claim 2, wherein said yoke base further comprises four yoke protrudes for said magnets to lean against.

4. The optical pickup actuator as claimed in claim 3, wherein said yoke protrudes further comprises a cover, and said lid covers a pair of said magnets.

\* \* \* \* \*